US007462395B2

(12) United States Patent
Longhenry et al.

(10) Patent No.: US 7,462,395 B2
(45) Date of Patent: Dec. 9, 2008

(54) FUSER MEMBER

(75) Inventors: Joy L Longhenry, Webster, NY (US); Richard P Carney, Rochester, NY (US); Alan R Kuntz, Webster, NY (US); Kevin H Taft, Williamson, NY (US); Cindy C Chen, Rochester, NY (US); Huoy-Jen Yuh, Pittsford, NY (US); Christopher D Blair, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 473 days.

(21) Appl. No.: 11/276,143

(22) Filed: Feb. 15, 2006

(65) Prior Publication Data

US 2007/0190320 A1 Aug. 16, 2007

(51) Int. Cl.
*B05D 3/00* (2006.01)
*B32B 27/18* (2006.01)
*B32B 27/28* (2006.01)
*G03G 15/20* (2006.01)

(52) U.S. Cl. ........................ 428/421; 428/422; 428/447; 427/385.5; 399/333

(58) Field of Classification Search ........................ None
See application file for complete search history.

(56) References Cited

U.S. PATENT DOCUMENTS 4,029,827 A 6/1977 Imperial et al.
4,101,686 A 7/1978 Strella et al.
4,185,140 A 1/1980 Strella et al.
4,257,699 A 3/1981 Lentz
4,264,181 A 4/1981 Lentz et al.
4,272,179 A 6/1981 Seanor
4,515,884 A 5/1985 Field et al.
4,789,565 A * 12/1988 Kon et al. .................... 427/375
4,968,766 A 11/1990 Kendziorski
5,017,432 A 5/1991 Eddy et al.
5,061,965 A 10/1991 Ferguson et al.
5,166,031 A 11/1992 Badesha et al.
5,281,506 A 1/1994 Badesha et al.
5,366,772 A 11/1994 Badesha et al.
5,370,931 A 12/1994 Fratangelo et al.
5,401,570 A 3/1995 Heeks et al.
5,409,557 A 4/1995 Mammino et al.
5,463,009 A 10/1995 Okada et al.
5,487,707 A 1/1996 Sharf et al.
5,512,409 A 4/1996 Henry et al.
5,514,436 A 5/1996 Schlueter, Jr. et al.
5,516,361 A 5/1996 Chow et al.
5,568,239 A 10/1996 Furukawa et al.
5,624,780 A 4/1997 Nishimori et al.
5,627,000 A 5/1997 Yamazaki et al.
5,636,012 A 6/1997 Uneme et al.
5,641,603 A 6/1997 Yamazaki et al.
5,698,320 A 12/1997 Ebisu et al.

(Continued)

OTHER PUBLICATIONS

U.S. Appl. No. 11/089,149, filed Mar. 25, 2005, Sacripante et al.

(Continued)

*Primary Examiner*—Ramsey Zacharia
(74) *Attorney, Agent, or Firm*—Oliff & Berridge, PLC

(57) ABSTRACT

A fuser member includes a substrate and an outer layer including a polymeric material and a methacrylate-based fluorosurfactant.

19 Claims, 1 Drawing Sheet

U.S. PATENT DOCUMENTS

| | | | | |
|---|---|---|---|---|
| 5,716,747 | A | 2/1998 | Uneme et al. | |
| 5,757,214 | A | 5/1998 | Stoddard et al. | |
| 5,991,590 | A | 11/1999 | Chang et al. | |
| 6,099,673 | A | 8/2000 | Van Bennekom | |
| 6,197,989 | B1 | 3/2001 | Furukawa et al. | |
| 6,253,055 | B1 | 6/2001 | Badesha et al. | |
| 6,377,774 | B1 | 4/2002 | Maul et al. | |
| 6,408,753 | B1 | 6/2002 | Finn et al. | |
| 6,515,069 | B1 * | 2/2003 | Gervasi et al. | 524/588 |
| 2003/0139549 | A1 * | 7/2003 | Savu et al. | 526/243 |
| 2004/0185271 | A1 | 9/2004 | Kaplan et al. | |
| 2005/0048294 | A1 | 3/2005 | Kaplan et al. | |
| 2005/0136351 | A1 | 6/2005 | Vandewinckel et al. | |
| 2005/0136352 | A1 | 6/2005 | Vandewinckel et al. | |
| 2005/0287458 | A1 | 12/2005 | Veregin et al. | |
| 2005/0287459 | A1 | 12/2005 | Moffat et al. | |
| 2005/0287460 | A1 | 12/2005 | Moffat et al. | |

OTHER PUBLICATIONS

U.S. Appl. No. 11/142,387, filed Jun. 2, 2005, Blair et al.
U.S. Appl. No. 11/135,812, filed May 23, 2005, Kaplan et al.
U.S. Appl. No. 11/135,823, filed May 23, 2005, Kaplan et al.
U.S. Appl. No. 11/136,171, filed May 23, 2005, Kaplan et al.
U.S. Appl. No. 11/136,166, filed May 23, 2005, Kaplan et al.

* cited by examiner

FUSER MEMBER

TECHNICAL FIELD

This disclosure is generally directed to fuser members useful in electrophotographic reproducing apparatuses, including digital, image on image, and contact electrostatic printing apparatuses. The present fuser members can be used as fuser members, pressure members, transfuse or transfix members, and the like. In an embodiment, the fuser members comprise an outer layer comprising a methacrylate-based fluorosurfactant such as a polyfluoroacrylate derivative of a methylmethacrylate. This disclosure also relates to processes for making and using the imaging members.

RELATED APPLICATIONS

Copending U.S. patent application Ser. No. 11/142,387 filed Jun. 2, 2005, discloses a fuser member comprising: a substrate; and an outer layer comprising a polymeric material; wherein said polymeric material is post-halogenated to provide a post-halogenated polymeric material.

The appropriate components and process aspects of the foregoing, such as the fuser member composition, components and methods, may be selected for the present disclosure in embodiments thereof. The entire disclosures of the above-mentioned application is totally incorporated herein by reference.

REFERENCES

U.S. Pat. No. 4,257,699 to Lentz, discloses a fuser member comprising at least one outer layer of an elastomer containing a metal-containing filler and use of a polymeric release agent.

U.S. Pat. No. 4,264,181 to Lentz et al., discloses a fuser member having an elastomer surface layer containing metal-containing filler therein and use of a polymeric release agent.

U.S. Pat. No. 4,272,179 to Seanor, discloses a fuser member having an elastomer surface with a metal-containing filler therein and use of a mercapto-functional polyorganosiloxane release agent.

U.S. Pat. No. 5,401,570 to Heeks et al., discloses a fuser member comprised of a substrate and thereover a silicone rubber surface layer containing a filler component, wherein the filler component is reacted with a silicone hydride release oil.

U.S. Pat. No. 4,515,884 to Field et al., discloses a fuser member having a silicone elastomer-fusing surface, which is coated with a toner release agent, which includes an unblended polydimethyl siloxane.

U.S. Pat. No. 5,512,409 to Henry et al. teaches a method of fusing thermoplastic resin toner images to a substrate using amino functional silicone oil over a hydrofluoroelastomer fuser member.

U.S. Pat. No. 5,516,361 to Chow et al. teaches a fusing member having a thermally stable FKM hydrofluoroelastomer surface and having a polyorgano T-type amino functional oil release agent. The oil has predominantly monoamino functionality per active molecule to interact with the hydrofluoroelastomer surface.

U.S. Pat. No. 6,253,055 to Badesha et al. discloses a fuser member coated with a hydride release oil.

U.S. Pat. No. 5,991,590 to Chang et al. discloses a fuser member having a low surface energy release agent outermost layer.

U.S. Pat. No. 6,377,774 B1 to Maul et al. discloses an oil web system.

U.S. Pat. No. 6,197,989 B1 to Furukawa et al. discloses a fluorine-containing organic silicone compound represented by a formula.

U.S. Pat. No. 5,757,214 to Kato et al. discloses a method for forming color images by applying a compound which contains a fluorine atoms and/or silicon atom to the surface of electrophotographic light-sensitive elements.

U.S. Pat. No. 5,716,747 to Uneme et al. discloses a fluororesin coated fixing device with a coating of a fluorine containing silicone oil.

U.S. Pat. No. 5,698,320 to Ebisu et al. discloses a fixing device coated with a fluororesin, and having a fluorosilicone polymer release agent.

U.S. Pat. No. 5,641,603 to Yamazaki et al. discloses a fixing method using a silicone oil coated on the surface of a heat member.

U.S. Pat. No. 5,636,012 to Uneme et al. discloses a fixing device having a fluororesin layer surface, and using a fluorine-containing silicone oil as a repellant oil.

U.S. Pat. No. 5,627,000 to Yamazaki et al. discloses a fixing method having a silicone oil coated on the surface of the heat member, wherein the silicone oil is a fluorine-containing silicone oil and has a specific formula.

U.S. Pat. No. 5,624,780 to Nishimori et al. discloses a fixing member having a fluorine-containing silicone oil coated thereon, wherein the silicone oil has a specific formula.

U.S. Pat. No. 5,568,239 to Furukawa et al. discloses a stainproofing oil for heat fixing, wherein the fluorine-containing oil has a specific formula.

U.S. Pat. No. 5,463,009 to Okada et al. discloses a fluorine-modified silicone compound having a specific formula, wherein the compound can be used for oil-repellancy in cosmetics.

U.S. Pat. No. 4,968,766 to Kendziorski discloses a fluorosilicone polymer for coating compositions for longer bath life.

The use of polymeric release agents having functional groups, which interact with a fuser member to form a thermally stable, renewable self-cleaning layer having good release properties for electroscopic thermoplastic resin toners, is described in U.S. Pat. Nos. 4,029,827; 4,101,686; and. 4,185,140. Disclosed in U.S. Pat. No. 4,029,827 is the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether and mercapto groups as release fluids. U.S. Pat. No. 5,716,747 discloses the use of fluorine-containing silicone oils for use on fixing rollers with outermost layers of ethylene tetrafluoride perfluoro alkoxyethylene copolymer, polytetrafluoroethylene and polyfluoroethylenepropylene copolymer. U.S. Pat. No. 5,698,320 discloses the use of fluorosilicone polymers for use on fixing rollers with outermost layers of perfluoroalkoxy and tetrafluoroethylene resins.

The disclosures of each of the foregoing patents are hereby incorporated by reference herein in their entireties. The appropriate components and process aspects of the each of the foregoing patents may also be selected for the present compositions and processes in embodiments thereof.

BACKGROUND

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It may be undesirable; however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combinations of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface, which has a low surface energy to provide the necessary release. To ensure and maintain good release properties of the fuser roll, it has become customary to apply release agents to the fuser roll during the fusing operation. Typically, these materials are applied as thin films of, for example, nonfunctional silicone oils or mercapto- or amino-functional silicone oils, to prevent toner offset.

SUMMARY

In producing fuser and related members, the members are made by applying sequential layers to a substrate, and allowing or causing the layers to dry. Often, a surfactant or leveling agent is desired or even required in order to produce a defect-free coating. For example, in producing some fuser members, the use of a leveling agent reduces the formation of a coating defect known as a "fisheye." A "fisheye" is a spot either devoid of fluoroelastomer topcoat layer or having reduced topcoat layer thickness, which topcoat layer is typically 1 to 5 millimeters in size. It is believed to be nucleated by a piece of surface contamination, though this is not necessary to its formation. In the past, it was found that acceptable product yield in a production process could be low, such as less than 30% due to the formation of fisheyes, without a surfactant in the coating formulation. Such defects in the fuser member layer can cause undesirable image defects on the printed copy, such as toner spots, toner picking (i.e., removal of toner leaving white spots), non-uniform gloss, hot offset, and poor image permanence. There exists a need for a flow coating solution that forms a fuser member layer surface that is smooth and free or substantially free of such defects.

In some processes, a surfactant labeled FC-430, an acrylate copolymer with pendant glycol and perfluorooctane sulfonate groups manufactured by 3M, is used for the purpose of fisheye reduction in forming fuser member topcoat layers. Use of this surfactant can reduce the defect rate to or less than 1%, or providing an acceptable product yield in a production process of 99% or greater. However, FC-430 has been deemed to be environmentally persistent by the EPA, and is no longer commercially available in some countries. There is thus a desire to replace FC-430, and similar materials, with a new leveling agent that provides acceptable results in fuser member production. It is desired to provide a fluoroelastomer fuser member layer that reduces or eliminates surface defects, including fisheyes, and that performs well as a fuser member, and does not degrade other properties or desired features of the fuser member layer.

This disclosure in embodiments relates to a fuser member comprising:

a substrate; and an outer layer comprising a polymeric material and a methacrylate-based fluorosurfactant.

In other embodiments, the disclosure relates to a method of making a fuser member, comprising:

applying an outer layer comprising a polymeric material and a methacrylate-based fluorosurfactant over a substrate.

In another embodiment, the disclosure provides an image forming apparatus for forming images on a recording medium comprising:

a charge-retentive surface to receive an electrostatic latent image thereon;

a development component to apply a developer material to the charge-retentive surface to develop the electrostatic latent image to form a developed image on the charge retentive surface;

a transfer component to transfer the developed image from the charge retentive surface to a copy substrate; and a fuser member component to fuse the transferred developed image to the copy substrate, wherein the fuser member comprises:

a substrate; and an outer layer comprising a polymeric material and a methacrylate-based fluorosurfactant.

BRIEF DESCRIPTION OF THE DRAWINGS

These and other advantages and features of this disclosure will be apparent from the following, especially when considered with the accompanying drawings, in which.

EMBODIMENTS

The fuser member has an outer layer comprising a methacrylate-based fluorosurfactant such as a polyfluoroacrylate derivative of a methylmethacrylate. This methacrylate-based fluorosurfactant allows the outer layer of the fuser member to be formed as a substantially or fully defect-free coating, thus reducing or eliminating the occurrence of such defects as fisheyes. The methacrylate-based fluorosurfactant has been found to be a good substitution for previous surfactant materials, such as the conventional FC-430 surfactant, which have been deemed to be environmentally persistent by government agencies and thus whose use has been discouraged or discontinued. Embodiments include a process for producing a fuser member coating comprising a) adding and reacting a fluoroelastomer, a crosslinking agent, a polar solvent, and a methacrylate-based fluorosurfactant, and b) providing the coating solution on the fuser member to form a fuser member coating.

The methacrylate-based fluorosurfactant, in embodiments, enables adequate or desired fuser member performance. In embodiments, the fisheye reduction observed from use of the methacrylate-based fluorosurfactant is comparable to the fisheye reduction observed using conventional surfactant materials, such as the conventional FC-430 surfactant. In still other embodiments, however, such comparable fisheye reduction can be achieved using lower relative levels of the methacrylate-based fluorosurfactant as compared to the conventional surfactant materials.

Figure 1:
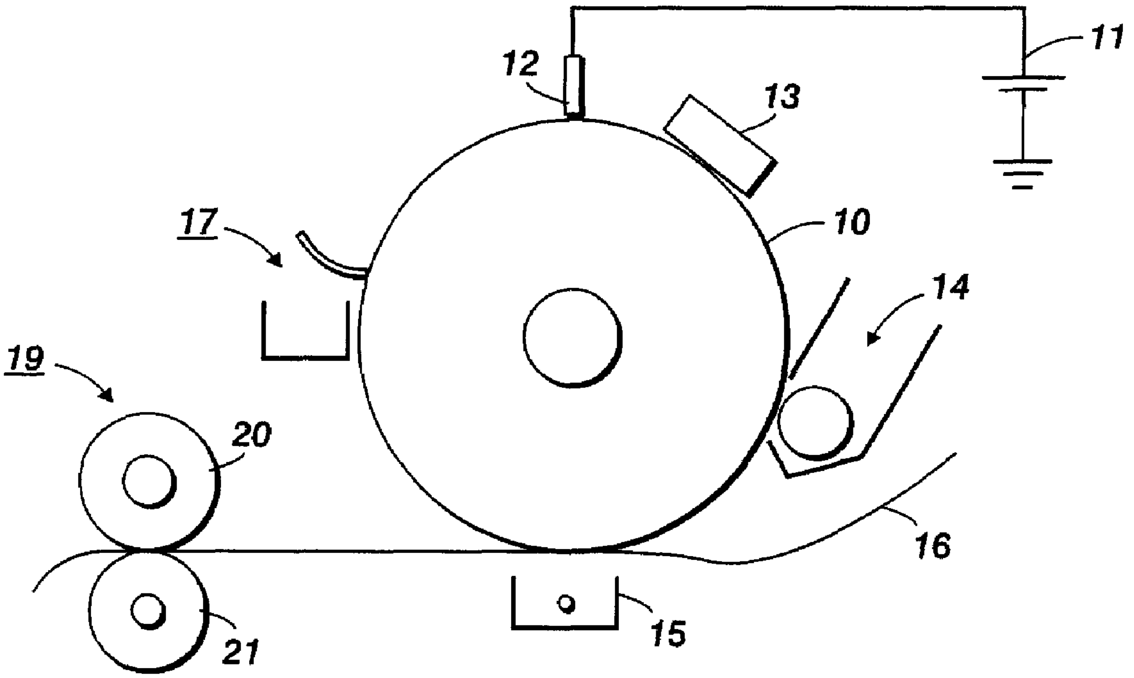
FIG. 1 is a schematic illustration of an image apparatus in accordance with the present disclosure.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG. 1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
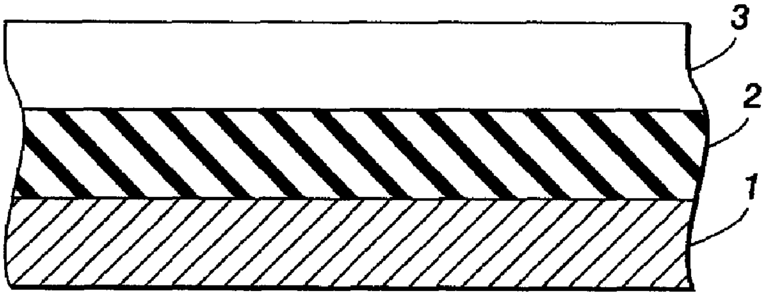
FIG. 2 is an enlarged, side view of an embodiment of a fuser member, showing a fuser member with a substrate, intermediate layer, and post-halogenated outer layer.

FIG. 2 is an enlarged schematic view of an embodiment of a fuser member, demonstrating the various possible layers. As shown in FIG. 2, substrate 1 has intermediate layer 2 thereon. Intermediate layer 2 can be, for example, a rubber such as silicone rubber or other suitable rubber material. On intermediate layer 2 is positioned outer layer 3 comprising a polymer as described below.

The term "fuser member" as used herein refers to fuser members including fusing rolls, belts, films, sheets, and the like; donor members, including donor rolls, belts, films, sheets, and the like; and pressure members, including pressure rolls, belts, films, sheets, and the like; and other members useful in the fusing system of an electrostatographic or xerographic, including digital, machine. The fuser member of the present disclosure can be employed in a wide variety of machines, and is not specifically limited in its application to the particular embodiment depicted herein.

The outer layer of the fuser member can be formed of any suitable polymeric material, including, but not limited to, polyolefins, fluorinated hydrocarbons (fluorocarbons), and engineered resins. The outer layer can comprise homopolymers, copolymers, higher order polymers, or mixtures thereof, and can comprise one species of polymeric material or mixtures of multiple species of polymeric material, such as mixtures of two, three, four, rive or more multiple species of polymeric material. In embodiments, the outer layer is formed of a fluoroelastomer.

Specifically, suitable fluoroelastomers are those described in detail in U.S. Pat. Nos. 5,166,031, 5,281,506, 5,366,772, 5,370,931, 4,257,699, 5,017,432 and 5,061,965, the disclosures each of which are incorporated by reference herein in their entirety. As described therein, these elastomers are from the class of 1) copolymers of vinylidenefluoride and hexafluoropropylene; 2) terpolymers of vinylidenefluoride, hexafluoropropylene and tetrafluoroethylene; and 3) tetrapolymers of vinylidenefluoride, hexafluoropropylene, tetrafluoroethylene and cure site monomer, are known commercially under various designations as VITON A®, VITON B®, VITON E®, VITON E 60C®, VITON E430®, VITON 910®, VITON GH®; VITON GF®; Viton GF-S; and VITON ETP®. The VITON® designation is a Trademark of E.I. DuPont de Nemours, Inc. The cure site monomer can be 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known cure site monomer commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIRO, FOR-LHF®, NM® FOR-THF®, FOR-TFS®, TH®, and TN505®, available from Montedison Specialty Chemical Company.

Examples of fluoroelastomers useful for the surfaces of fuser members include fluoroelastomers, such as fluoroelastomers of vinylidenefluoride-based fluoroelastomers, hexafluoropropylene and tetrafluoroethylene as comonomers. There are also copolymers of one of vinylidenefluoride, hexafluoropropylene and tetrafluoroethylene. Examples of three known fluoroelastomers are (1) a class of copolymers of two of vinylidenefluoride, hexafluoropropylene and tetrafluoroethylene, such as those known commercially as VITON A® (2) a class of terpolymers of vinylidenefluoride, hexafluoropropylene and tetrafluoroethylene known commercially as VITON B® and (3) a class of tetrapolymers of vinylidenefluoride, hexafluoropropylene, tetrafluoroethylene and cure site monomer known commercially as VITON GH® or VITON GF®.

The fluoroelastomers VITON GH® and VITON GF® have relatively low amounts of vinylidenefluoride. The VITON GF® and Viton GH® have about 35 weight percent of vinylidenefluoride, about 34 weight percent of hexafluoropropylene and about 29 weight percent of tetrafluoroethylene with about 2 weight percent cure site monomer.

The amount of fluoroelastomer compound in solution in the outer layer solutions, in weight percent total solids, is from about 10 to about 25 percent, or from about 16 to about 22 percent by weight of total solids. Total solids as used herein include the amount of fluoroelastomer, dehydrofluorinating agent and optional adjuvants and fillers, including metal oxide fillers.

In addition to the fluoroelastomer, the outer layer may comprise a fluoropolymer or other fluoroelastomer blended with the above fluoroelastomer. Examples of suitable polymer blends include the above fluoroelastomer, blended with a fluoropolymer selected from the group consisting of polytetrafluoroethylene and perfluoroalkoxy. The fluoroelastomer can also be blended with non-fluorinated ethylene or non-fluorinated propylene.

The fuser member outer layer coating solution also contains a surfactant. In embodiments, the surfactant is a methacrylate-based fluorosurfactant such as a polyfluoroacrylate derivative of a methylmethacrylate, or a polyfluoroacrylate methylmethacrylate. The methacrylate-based fluorosurfactant is believed to have the structure:

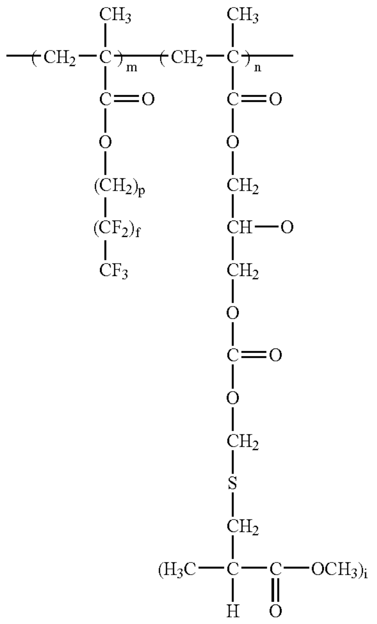

In this formula, m and n independently represent integers of from about 1 to about 300 such as from 1 to about 200, p represents an integer of from about 1 to about 100 such as from about 1 to about 50 or from about 1 to about 20, f represents an integer of from about 1 to about 20 such as from about 5 to about 15, and i represents an integer of from about 1 to about 500 such as from about 1 to about 100 or to about 200 or from about 5 to about 75. In embodiments, it is desired that the number of side chains be substantially equal. That is, in embodiments, it is desired that the variables m and n differ by less than about 10%, such as less than about 5% or less than about 1%, or be selected such that m=n. In some embodiments, m and n independently represent integers of from about 1 to about 99, p represents an integer of from about 1 to about 10, f represents an integer of about 8, and i represents an integer of from about 10 to about 500.

Such methacrylate-based fluorosurfactants are commercially available. For example, a suitable commercial methacrylate-based fluorosurfactant product is GF300, available from Toagosei. Another suitable commercial methacrylate-based fluorosurfactant product is believed to include, for example, FluorN 489 by Cytonix Corp., which is believed to be a methacrylate fluorosurfactant.

Another property of the methacrylate-based fluorosurfactant that can be described is the molar ratio of fluoride to sulfate. In embodiments, the molar ratio of fluoride to sulfate can be, for example, from about 10:1 to about 30:1, such as about 15:1 to about 25:1, although not limited to these ranges. For example, ion analysis of the commercial product GF-300 shows a molar ratio of fluoride to sulfate of about 19:1.

The methacrylate-based fluorosurfactant can be incorporated into the outer layer coating solution in any desired amount, such as to provide a coating solution that achieves defect-free or substantially defect-free coatings. In embodiments, the amount of methacrylate-based fluorosurfactant included in the coating solution can be, for example, from about 0.01 or from about 0.1 to about 10 or to about 15% by weight, such as from about 0.5 to about 5% by weight of the coating solution. An advantage of the methacrylate-based fluorosurfactant, as opposed to conventional surfactant materials, is that comparable results can be obtained with a lesser amount of the methacrylate-based fluorosurfactant. Thus, for example, whereas conventional surfactant materials are typically included in an amount of from about 4 to about 6% by weight of the coating solution, the methacrylate-based fluorosurfactant can be included in a lesser amount of from about 0.5 to about 2% by weight of the coating solution, while still achieving the same leveling and fisheye-reduction effects.

The methacrylate-based fluorosurfactant is, in embodiments, suitably used as the only surfactant or leveling agent present in the coating solution. In these embodiments, the methacrylate-based fluorosurfactant can be a single type of methacrylate-based fluorosurfactant, or it can be a mixture of two or more, such as three, four, five or more, different types of methacrylate-based fluorosurfactant. However, if desired, the methacrylate-based fluorosurfactant can be used in combination with one or more other surfactants that are not methacrylate-based fluorosurfactants.

If necessary or desired, a defoamer agent can also be used in the outer layer coating solution in addition to the methacrylate-based fluorosurfactant. For example, it has been found that some methacrylate-based fluorosurfactants may cause foaming of the coating solution, although this is believed to be a mechanical phenomenon rather than evidence of a chemical reaction. Use of conventional defoaming agents, such as Chemie BYK-052, in known amounts can thus counteract the tendancy of foam formation.

Other adjuvants and fillers can be incorporated in the polymer of the outer surface layer, provided that they do not affect the integrity of the polymer material. Such fillers normally encountered in the compounding of elastomers include coloring agents, reinforcing fillers, processing aids, accelerators, and the like. Oxides, such as magnesium oxide, and hydroxides, such as calcium hydroxide, are suitable for use in curing many fluoroelastomers. Other metal oxides, such as cupric oxide, lead oxide and/or zinc oxide, can also be used to improve release. Metal oxides, such as copper oxide, aluminum oxide, magnesium oxide, tin oxide, titanium oxide, iron oxide, zinc oxide, manganese oxide, molybdenum oxide, and the like, carbon black, graphite, metal fibers and metal powder particles such as silver, nickel, aluminum, and the like, as well as mixtures thereof, can promote thermal conductivity. The addition of silicone particles to a fluoropolymer outer fusing layer can increase release of toner from the fuser member during and following the fusing process. Processability of a fluoropolymer outer fusing layer can be increased by increasing absorption of silicone oils, in particular by adding fillers such as fumed silica or clays such as organo-montmorillonites. Also suitable are reinforcing calcined alumina and non-reinforcing tabular alumina.

An inorganic particulate filler may be used in connection with the fluoroelastomer outer layer. Such inorganic fillers have traditionally been used in order to provide anchoring sites for the functional groups of an applied silicone fuser agent. However, a filler is not necessary for use with the present fuser member, having a post-halogenated surface layer not requiring a separate release agent. In fact, dispensing with a metal oxide increases fuser life and decreases fabrication costs. Examples of suitable fillers include a metal-containing filler, such as a metal, metal alloy, metal oxide, metal salt or other metal compound. The general classes of metals which are applicable to the present invention include those metals of Groups 1b, 2a, 2b, 3a, 3b, 4a, 4b, 5a, 5b, 6b, 7b, 8 and the rare earth elements of the Periodic Table. The filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers are aluminum oxide and cupric oxide. Other examples include reinforcing and non-reinforcing calcined alumina and tabular alumina respectively.

The thickness of the outer fluoroelastomer surface layer of the fuser member herein is from about 10 to about 250 micrometers, such as from about 15 to about 100 micrometers.

Any suitable substrate can be selected for the fuser member. The fuser member substrate can be a roll, belt, flat surface, sheet, film, or other suitable shape used in the fixing of thermoplastic toner images to a suitable copy substrate. It can take the form of a fuser member, a pressure member, or a release agent donor member, for example in the form of a cylindrical roll. Typically, the fuser member is made of a hollow cylindrical metal core, such as copper, aluminum, stainless steel, or certain plastic materials chosen to maintain rigidity and structural integrity, as well as being capable of having a polymeric material coated thereon and adhered firmly thereto. It is desired in embodiments that the supporting substrate is a cylindrical sleeve, such as with an outer polymeric layer of from about 1 to about 6 millimeters. In one embodiment, the core, which can be an aluminum or steel cylinder, is degreased with a solvent and cleaned with an abrasive cleaner prior to being primed with a primer, such as Dow Corning® 1200, which can be sprayed, brushed, or dipped, followed by air drying under ambient conditions for thirty minutes and then baked at 150° C. for 30 minutes.

Also suitable are quartz and glass substrates. The use of quartz or glass cores in fuser members allows for a light-weight, low cost fuser system member to be produced. Moreover, the glass and quartz help allow for quick warm-up, and are therefore energy efficient. In addition, because the core of the fuser member comprises glass or quartz, there is a real possibility that such fuser members can be recycled. Moreover, these cores allow for high thermal efficiency by providing superior insulation.

When the fuser member is a belt, the substrate can be of any desired or suitable material, including plastics, such as Ultem®, available from General Electric, Ultrapek®, available from BASF, PPS (polyphenylene sulfide) sold under the tradenames Fortron®, available from Hoechst Celanese, Ryton R-4®, available from Phillips Petroleum, and Supec®, available from General Electric; PAI (polyamide imide), sold under the tradename Torlon® 7130, available from Amoco; polyketone (PK), sold under the tradename Kadel® E1230, available from Amoco; PI (polyimide); polyaramide; PEEK (polyether ether ketone), sold under the tradename PEEK 450GL30, available from Victrex; polyphthalamide sold under the tradename Amodel®, available from Amoco; PES (polyethersulfone); PEI (polyetherimide); PAEK (polyaryletherketone); PBA (polyparabanic acid); silicone resin; and fluorinated resin, such as PTFE (polytetrafluoroethylene); PFA (perfluoroalkoxy); FEP (fluorinated ethylene propylene); liquid crystalline resin (Xydar®), available from Amoco; and the like, as well as mixtures thereof. These plastics can be filled with glass or other minerals to enhance their mechanical strength without changing their thermal properties. In embodiments, the plastic comprises a high temperature plastic with superior mechanical strength, such as polyphenylene sulfide, polyamide imide, polyimide, polyketone, polyphthalamide, polyether ether ketone, polyethersulfone, and polyetherimide. Suitable materials also include silicone rubbers. Examples of belt-configuration fuser members are disclosed in, for example, U.S. Pat. Nos. 5,487,707 and 5,514,436, the disclosures of each of which are totally incorporated herein by reference. A method for manufacturing reinforced seamless belts is disclosed in, for example, U.S. Pat. No. 5,409,557, the disclosure of which is totally incorporated herein by reference.

The optional intermediate layer can be of any suitable or desired material. For example, the optional intermediate layer can comprise a silicone rubber of a thickness sufficient to form a conformable layer. Suitable silicone rubbers include room temperature vulcanization (RTV) silicone rubbers, high temperature vulcanization (HTV) silicone rubbers, and (LSR) liquid silicone rubber. These rubbers are known and are readily available commercially such as SILASTIC® 735 black RTV and SILASTIC® 732 RTV, both available from Dow Corning, and 106 RTV Silicone Rubber and 90 RTV Silicone Rubber, both available from General Electric. Other suitable silicone materials include the silanes, siloxanes (such as polydimethylsiloxanes), such as fluorosilicones, dimethylsilicones, liquid silicone rubbers, such as vinyl crosslinked heat curable rubbers or silanol room temperature crosslinked materials, and the like. Other materials suitable for the intermediate layer include polyimides and fluoroelastomers, including those set forth below.

The optional intermediate layer typically has a thickness of from about 0.05 to about 10 millimeters, such as from about 0.1 to about 5 millimeters, or from about 1 to about 3 millimeters, although the thickness can be outside of these ranges. More specifically, if the intermediate layer is present on a pressure member, it typically has a thickness of from about 0.05 to about 5 millimeters, such as from about 0.1 to about 3 millimeters, or from about 0.5 to about 1 millimeter, although the thickness can be outside of these ranges. When present on a fuser member, the intermediate layer typically has a thickness of from about 1 to about 10 millimeters, such as from about 2 to about 5 millimeters, or from about 2.5 to about 3 millimeters, although the thickness can be outside of these ranges. In an embodiment, the thickness of the intermediate layer of the fuser member is higher than that of the pressure member, so that the fuser member is more deformable than the pressure member.

The polymer layers of the fuser member can be coated on the fuser member substrate by any desired or suitable means, including normal spraying, dipping, and tumble spraying techniques. A flow coating apparatus as described in U.S. Pat. No. 6,408,753, the disclosure of which is totally incorporated herein by reference, can also be used to flow coat a series of fuser rolls. It is desired in embodiments that the polymers be diluted with a solvent, prior to application to the fuser substrate. Alternative methods, however, can be used for coating layers, including methods described in U.S. Pat. No. 6,099,673, the disclosure of which is totally incorporated herein by reference.

Optional intermediate adhesive layers and/or intermediate polymer or elastomer layers may be applied to achieve desired properties and performance objectives of the present disclosure. The intermediate layer may be present between the substrate and the outer fluoroelastomer surface. An adhesive intermediate layer may be selected from, for example, epoxy resins and polysiloxanes. Examples of suitable intermediate layers include silicone rubbers such as room temperature vulcanization (RTV) silicone rubbers; high temperature vulcanization (HTV) silicone rubbers and liquid silicone rubber (LSR) silicone rubbers. These rubbers are known and readily is available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

There may be provided an adhesive layer between the substrate and the intermediate layer. There may also be an adhesive layer between the intermediate layer and the outer layer. In the absence of an intermediate layer, the fluoroelastomer layer may be bonded to the substrate via an adhesive layer.

The thickness of the intermediate layer is from about 0.5 to about 20 mm, or from about 1 to about 5 mm. In embodiments where the intermediate layer is an adhesive layer, the adhesive layer thickness can be, for example, about 5 to about 20 microns.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Comparative Example 1

A conventional fuser member is prepared as follows. A fuser member coating formulation was prepared from a solvent solution/dispersion containing 100 parts by weight of a hydrofluoroelastomer, DuPont Viton® GF, a tetrapolymer of 35 weight percent vinylidenefluoride, 34 weight percent hexafluoropropylene, 29 weight percent tetrafluoroethylene, and 2 weight percent of a cure site monomer. The Viton® GF was mixed with 7 parts by weight of DuPont Viton® Curative 50, 1.5 parts by weight magnesium oxide (Maglite D available from C. P. Hall, Chicago, Ill.), 0.75 parts by weight calcium hydroxide, 0.75 parts by weight carbon black (N990 available from R. T. Vanderbilt Co.), 5.6 parts by weight Novec® FC-430 (available from 3M) in a mixture of methylethylketone and methylisobutyl ketone, which was dispensed onto a fuser roll surface via flow coating to a nominal thickness of about 20 micrometers. The coating was cured by stepwise heating in air at 95° C. for 2 hours, 175° C. for 2 hours, 205° C. for 2 hours, and 230° C. for 16 hours.

Example 1

A fuser member is prepared as in Comparative Example 1, except that the 5.6 weight % content of FC-430 in the outer layer coating solution is omitted, and in its place only 1 weight % of GF300 is substituted. The fuser member is then prepared in the same manner as above.

The fuser members prepared in Comparative Example 1 and Example 1 are inspected for fisheye occurrence and fusing performance. Visual inspection of the fuser members shows comparable occurrence of fisheyes on the two fuser members. This indicates that the composition of Example 1 is a good substitute for the composition of Comparative Example 1. Fuser performance of the two fuser members is also comparable, indicating that the composition change does not alter the fuser member performance.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A fuser member comprising:

a substrate; and an outer layer comprising a polymeric material and a methacrylate-based fluorosurfactant, wherein the methacrylate-based fluorosurfactant is a fluorine-containing graft copolymer based on methylmethacrylate with the structure:

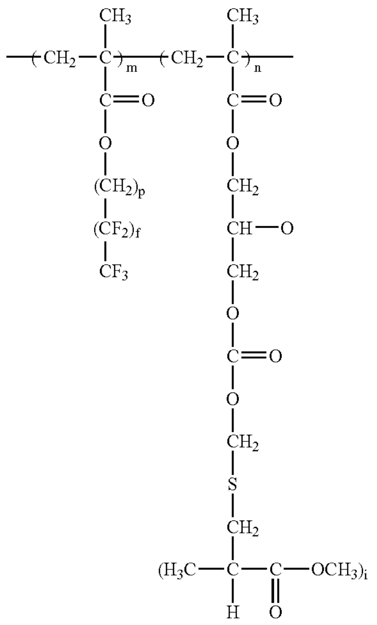

wherein m and n independently represent integers of from about 1 to about 300, p represents an integer of from about 1 to about 100, f represents an integer of from about 1 to about 20, and i represents an integer of from about 1 to about 500.

2. The fuser according to claim 1, wherein m and n independently represent integers of from 1 to about 200, p represents an integer of from about 1 to about 50, f represents an integer of from about 5 to about 15, and i represents an integer of from about 1 to about 100.

3. The fuser according to claim 1, wherein m and n independently represent integers of from about 1 to about 99, p represents an integer of from about 1 to about 10, f represents an integer of about 8, and i represents an integer of from about 10 to about 50.

4. The fuser according to claim 1, wherein m and n differ by less than about 10%.

5. The fuser according to claim 1, wherein m=n.

6. The fuser according to claim 1, wherein a molar ratio of fluoride to sulfate is from about 10:1 to about 30:1.

7. The fuser according to claim 1, wherein the methacrylate-based fluorosurfactant is present in an amount of from about 0.01 to about 15% by weight of a solution used to form the outer layer.

8. The fuser according to claim 1, wherein the methacrylate-based fluorosurfactant is present in an amount of from about 0.5 to about 5% by weight of a solution used to form the outer layer.

9. The fuser according to claim 1, wherein the methacrylate-based fluorosurfactant is the only surfactant present in the outer layer.

10. The fuser according to claim 1, wherein the outer layer further comprises a defoamer agent.

11. The fuser according to claim 1, wherein said polymeric material is a fluoroelastomer selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene, and a cure site monomer.

12. The fuser according to claim 11, wherein the fluoroelastomer is a tetrapolymer of vinylidene fluoride, hexafluoropropylene, tetrafluoroethylene, and a cure site monomer.

13. The fuser according to claim 11, wherein the fluoroelastomer comprises about 35 weight percent of vinylidenefluoride, about 34 weight percent of hexafluoropropylene, about 29 weight percent of tetrafluoroethylene, and about 2 weight percent cure site monomer.

14. The fuser according to claim 1, wherein the outer layer further comprises a fluoropolymer selected from the group consisting of polytetrafluoroethylene and perfluoroalkoxy.

15. The fuser according to claim 1, further comprising an intermediate layer positioned between the substrate and the outer layer.

16. The fuser according to claim 15, wherein the intermediate layer comprises silicone rubber.

17. A method of making a fuser member, comprising: applying an outer layer comprising a polymeric material and a methacrylate-based fluorosurfactant over a substrate, wherein the methacrylate-based fluorosurfactant is a fluorine-containing graft copolymer based on methylmethacrylate with the structure:

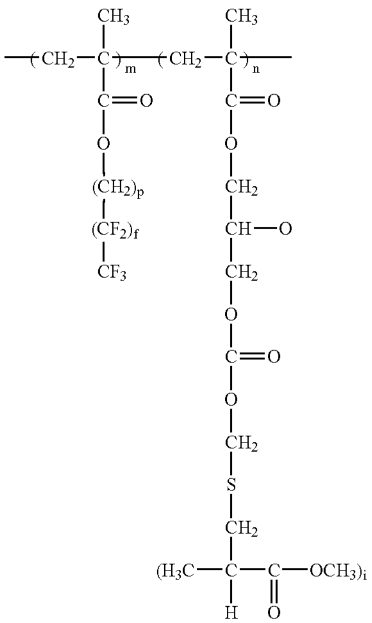

wherein m and n independently represent integers of from about 1 to about 300, p represents an integer of from about 1 to about 100, f represents an integer of from about 1 to about 20, and i represents an integer of from about 1 to about 500.

18. The method of claim 17, wherein the applying comprises:

reacting a fluoroelastomer, a crosslinking agent, a polar solvent, and methacrylate-based fluorosurfactant to form a coating solution, and providing the coating solution on the substrate to form a fuser member coating.

19. An image forming apparatus for forming images on a recording medium comprising:

a charge-retentive surface to receive an electrostatic latent image thereon;

a development component to apply a developer material to the charge-retentive surface to develop the electrostatic latent image to form a developed image on the charge retentive surface;

a transfer component to transfer the developed image from the charge retentive surface to a copy substrate; and a fuser member component to fuse the transferred developed image to the copy substrate, wherein the fuser member comprises:

a substrate; and an outer layer comprising a polymeric material and a methacrylate-based fluorosurfactant 1 wherein the methacrylate-based fluorosurfactant is a fluorine-containing graft copolymer based on methylmethacrylate with the structure:

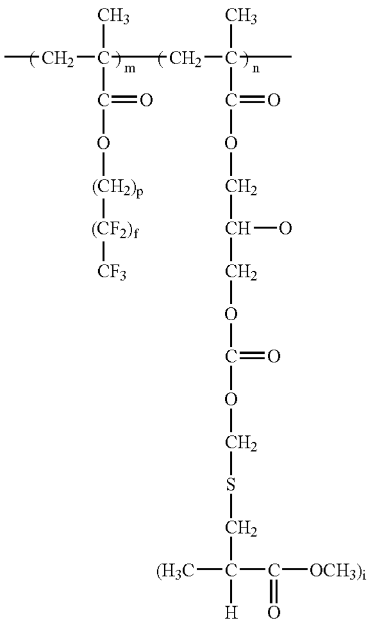

wherein m and n independently represent integers of from about 1 to about 300, p represents an integer of from about 1 to about 100, f represents an integer of from about 1 to about 20, and i represents an integer of from about 1 to about 500.

* * * * *